US012474706B2

(12) United States Patent
Fox et al.

(10) Patent No.: US 12,474,706 B2
(45) Date of Patent: Nov. 18, 2025

(54) SERVER TO MANAGE A PLURALITY OF ROBOTS

(71) Applicant: XTEND AI Inc., Middleburg, FL (US)

(72) Inventors: Harry Fox, Jerusalem (IL); Sergh Sapojnikov, Ashkelon (IL); Boris Zlotnikov, Tel Aviv (IL); Jacob Benjamin, Ma'ale Adumim (IL)

( * ) Notice: Subject to any disclaimer, the term of this patent is extended or adjusted under 35 U.S.C. 154(b) by 0 days.

(21) Appl. No.: 18/504,715

(22) Filed: Nov. 8, 2023

(65) Prior Publication Data

US 2024/0329634 A1    Oct. 3, 2024

Related U.S. Application Data

(62) Division of application No. 18/149,183, filed on Jan. 3, 2023, now Pat. No. 11,815,895.

(60) Provisional application No. 63/478,170, filed on Jan. 2, 2023, provisional application No. 63/411,156, filed on Sep. 29, 2022, provisional application No. 63/310,120, filed on Feb. 15, 2022, provisional application No. 63/304,621, filed on Jan. 30, 2022.

(51) Int. Cl.
    *G05D 1/00*    (2024.01)
(52) U.S. Cl.
    CPC ......... *G05D 1/0088* (2013.01); *G05D 1/0011* (2013.01)
(58) Field of Classification Search
    CPC .......................... G05D 1/0088; G05D 1/0011
    See application file for complete search history.

(56) References Cited

U.S. PATENT DOCUMENTS

| 11,227,235 B1 | 1/2022 | Cosic |
| 11,274,929 B1* | 3/2022 | Afrouzi ............... G06T 7/62 |
| 11,815,895 B2 | 11/2023 | Fox et al. |
| 2004/0068415 A1 | 4/2004 | Solomon |
| 2008/0133052 A1 | 6/2008 | Jones et al. |

(Continued)

FOREIGN PATENT DOCUMENTS

| CN | 108297098 A | 7/2018 |
| CN | 109514565 A | 3/2019 |
| CN | 111590610 A | 8/2020 |

OTHER PUBLICATIONS

Moreno Blas Laguna: "Experimental Evaluation of Robot Operating Systems in Distributed Teleoperated Scenarios", Bachelor Thesis, Universidad Carlos III de Madrid, Sep. 1, 2022 (Sep. 1, 2022), pp. 1-64.

(Continued)

*Primary Examiner* — Sohana Tanju Khayer
(74) *Attorney, Agent, or Firm* — JMB DAVIS BEN-DAVID

(57) ABSTRACT

A server to manage a plurality of robots, where each robot performs a specified set of tasks, includes a robot management table, an operational database, a preprocessor and an initializer. The robot management table lists per robot tasks and associated scripts according to a unique robot ID for each of the plurality of robots. The operational database stores operational data required to run the scripts. The preprocessor runs at least one algorithm to obtain and update the operational data. The initializer initializes a particular robot of the plurality of robots according to its unique robot ID with its associated the scripts when the server is in network communication with the particular robot.

7 Claims, 7 Drawing Sheets

(56) References Cited

U.S. PATENT DOCUMENTS

| | | | |
|---|---|---|---|
| 2014/0249671 A1 | 9/2014 | Halloran et al. | |
| 2017/0255198 A1 | 9/2017 | Rodriguez | |
| 2019/0018427 A1 | 1/2019 | Jeon | |
| 2019/0160675 A1* | 5/2019 | Paschall, II | G05D 1/617 |
| 2019/0378019 A1 | 12/2019 | Scheutz et al. | |
| 2019/0378077 A1* | 12/2019 | Look | G06Q 10/0631 |
| 2020/0053324 A1 | 2/2020 | Deyle | |
| 2020/0293301 A1* | 9/2020 | Sato | G06F 8/71 |
| 2021/0116907 A1* | 4/2021 | Altman | G08C 17/02 |
| 2021/0351982 A1 | 11/2021 | Albrecht | |
| 2022/0292967 A1 | 9/2022 | Kawashima | |
| 2023/0004166 A1* | 1/2023 | Sackinger | G05D 1/0274 |
| 2023/0069625 A1* | 3/2023 | Yi | G01C 21/206 |
| 2023/0083237 A1* | 3/2023 | Fox | B25J 9/1605 |
| 2023/0143597 A1* | 5/2023 | Gutierrez | G06Q 10/10 |
| | | | 715/764 |
| 2023/0186952 A1* | 6/2023 | Kataoka | G06Q 50/04 |
| | | | 386/241 |
| 2023/0196650 A1* | 6/2023 | Huh | G06V 20/20 |
| | | | 706/20 |

OTHER PUBLICATIONS

Anonymous Checkout: "ROS Index-nav2_map_server", Retrieved from the Internet, Oct. 21, 2021 (Oct. 21, 2021) URL: https://web.archive.org/web/20211021082453/https://index.ros.org/p/nav2_map_server/.

* cited by examiner

SERVER TO MANAGE A PLURALITY OF ROBOTS

CROSS REFERENCE TO RELATED APPLICATIONS

This application is a divisional application of U.S. patent application Ser. No. 18/149,183, filed 3 Jan. 2023, which claims priority and the benefit of U.S. Provisional Patent applications 63/304,621, filed 30 Jan. 2022, 63/310,120, filed 15 Feb. 2022, 63/411,156, filed 29 Sep. 2022 and 63/478,170, filed 2 Jan. 2023 all of which are incorporated herein by reference.

FIELD OF THE INVENTION

The present invention relates to the field of robots generally and to robots that operate offline in particular.

BACKGROUND OF THE INVENTION

For a better understanding of the invention, it is useful to understand the terminology and the basic elements that facilitate the operation of the robot.

Robots in the modern day fall generally into two categories. The first is an unintelligent robot with hyper-specific functionality, usually on assembly lines. There is also an intelligent, general function, sometimes mobile, robot that may use intelligence derived from both artificial intelligence (such as Cloud Artificial Intelligence) or from the processing of operational algorithms such as facial and object recognition, audio recognition etc.

Intelligent robots are becoming more and more part of everyday life. Such robots are used (for example) for medical care support, as waiters in restaurant, for takeaway deliveries etc.

These robots are typically controlled by a server which stores their data and functionality. The processing power needed to operate such robots typically requires large and costly processors. In order to be controlled by the server/ have access to data, resources and services, the robot is required to have some form of communication means with the server such as Bluetooth, Internet etc.

An intelligent online robot typically has access to a very large amount of data. With this data it can reliably pull operational data, or any other data, as it needs it ensuring it is always up to date. Without this ability, it is very difficult (or even impossible) to have a robot with complex functionality operate offline. It may be appreciated that a robot may not always been in communication with its server during its use. For example, a power outage could cause a Wi-Fi connection to fall, making the robot offline. Alternatively, the robot may be out of range of communication with its server. Thus, in order for the robot to perform autonomously offline, it would therefore require the full functionality provided by the server locally on the robot requiring large and expensive processors and storage capabilities. This full functionality may also include the processing power to run heavy operational algorithms in order to support the intelligence it requires in order to make decisions to operate independently.

Further, it is not practical nor cost effective to fit an entire server processing unit onto an individual robot in order for it to have the full gamut of functionality available when offline.

To effect the herein invention, the processors are generally larger and more costly than the average processor of a similar robot that operates using a server, as the server can offload much of the strenuous processing that would normally fall on the robot's processors. As the herein disclosed robot operates offline, that cannot be done. Accordingly, the processors of the robots of this invention are much smaller than the average server processor, as you cannot fit an entire server processing unit onto each robot at any reasonable size or cost-effectiveness. Therefore, the processors are larger than the average online robot and smaller than the average server processor.

Accordingly, there is a need in the industry and field for a device or system that can efficiently and effectively allow a robot to operate autonomously offline without utilizing the processors, data, information and ASI available on an external server.

SUMMARY OF THE PRESENT INVENTION

To achieve these and other objects, the herein device allows a robot to operate autonomously offline without utilizing the processors, data, information and ASI available on an external server.

Therefore, to achieve these and other objects, the herein disclosed invention is a method of using an intelligent, multi-function robot having and using internal Artificial Intelligence and functioning autonomously when not connected to external Artificial Intelligence, comprising the steps of: during a pre-initialization process or an initialization process prior to autonomous operation of said robot downloading from a server when the robot is online the functionality and data required for the robot to perform a particular task; during autonomous operation of the robot, said robot not using the external server or the external Artificial Intelligence; running software natively on the robot itself and the hardware processing the software is on the robot itself, and wherein data stored on the robot consists only of that necessary for performing preconfigured functions; limiting on board hardware processing power consists only of that necessary for performing the preconfigured functions; and adapting the robot for autonomous movement within a defined premises.

In a preferred embodiment, the robot being initialized to perform the task or tasks it is designed for only. Preferably, the preconfigured functions being selected from the group Artificial Intelligence (AI), communication with users, navigation, following users, recognizing individual users through voice and audio recognition, generating maps.

According to another aspect of the invention, the Invention constitutes an intelligent, multi-function robot capable of autonomous movement and comprising multiple functional modules and a brain. The functional modules perform functional features of the robot. Each functional module is packaged in its own isolated container and each container is a virtual environment container within which said module operates. The functional features are low resource processing tasks useful for autonomous operation of the robot.

The functional features include Navigation, Image Processing, Audio Processing or Video Processing.

According to another aspect of the invention, the Invention constitutes a server to manage a plurality of robots, each robot performing a specified set of tasks, the server comprising: a robot management table listing per robot tasks and associated scripts according to a unique robot ID for each of said plurality of robots; an operational database to store operational data required to run the scripts; a preprocessor to run at least one algorithm to obtain and update said operational data; and an initializer to initialize a particular robot according to its unique robot ID with its associated said scripts when the server is in network communication with that particular robot.

Another aspect of the invention constitutes a method of programming an intelligent, multi-task robot to use internal intelligence and to function autonomously when not connected to an external server, comprising the steps of: during a pre-initialization process or an initialization process prior to autonomous operation of the robot, dividing processing into low resource processing tasks for the robot and high resource processing tasks for the external server; initializing the robot with its low resource processing tasks, wherein the low resource processing tasks provide internal intelligence; during autonomous operation of the robot, the robot using the internal intelligence and not utilizing the server for external intelligence; wherein data for the internal intelligence stored on the robot consists only of that necessary for performing preconfigured functions.

Preferably, on board hardware processing power consists only of that necessary to provide to operate the low resource processing tasks. Further, the robot is adapted for autonomous movement within a defined premises.

According to another aspect of the invention, the Invention constitutes a robot for performing a predefined set of tasks, each task having multiple features, the robot comprising: a scripter to download, according to a unique ID number of the robot, a script and multiple virtual containers associated with the unique ID number from a server in communication with the robot, wherein one of the multiple virtual containers is a router to communicate with the server to download a subset of operational data to support the multiple virtual containers, a second one of the multiple virtual containers is a controller to control the robot according to the script, and each of the remaining virtual containers to perform one of said multiple features; and a robot database to store the subset of operational data, wherein the scripter operates when the robot is online with the server and said controller operates when the robot is offline from the server.

The individual processing power required for a robot to function and the memory required for data storage may be realistically reduced by using an initialization process which downloads the functionality and data required for the robot to perform a particular task when the robot is online with a dedicated server. The robot can be initialized to perform the task or tasks it is designed for only. Therefore, only data and instructions as required for the tasks are downloaded, requiring less processing power and therefore less expensive processors and memory units. A constant pinging operation between the robot and the server may allow for bi-directional updates between the server and the robot when it is determined that the robot is online. Thus, the robot may be designed from the data storage perspective and the software side by redesigning the software to accommodate functional optimizations that can run on limited processing power.

This way of working may also increase data security, reliability and usability, in particular, in the field of care giving, especially working with the elderly. With the elderly, there are typically issues with proper adoption and usage. Elderly people who are not so technologically savvy may need a steady and reliable usage ability that encourages the building of a trusting relationship with the robot.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
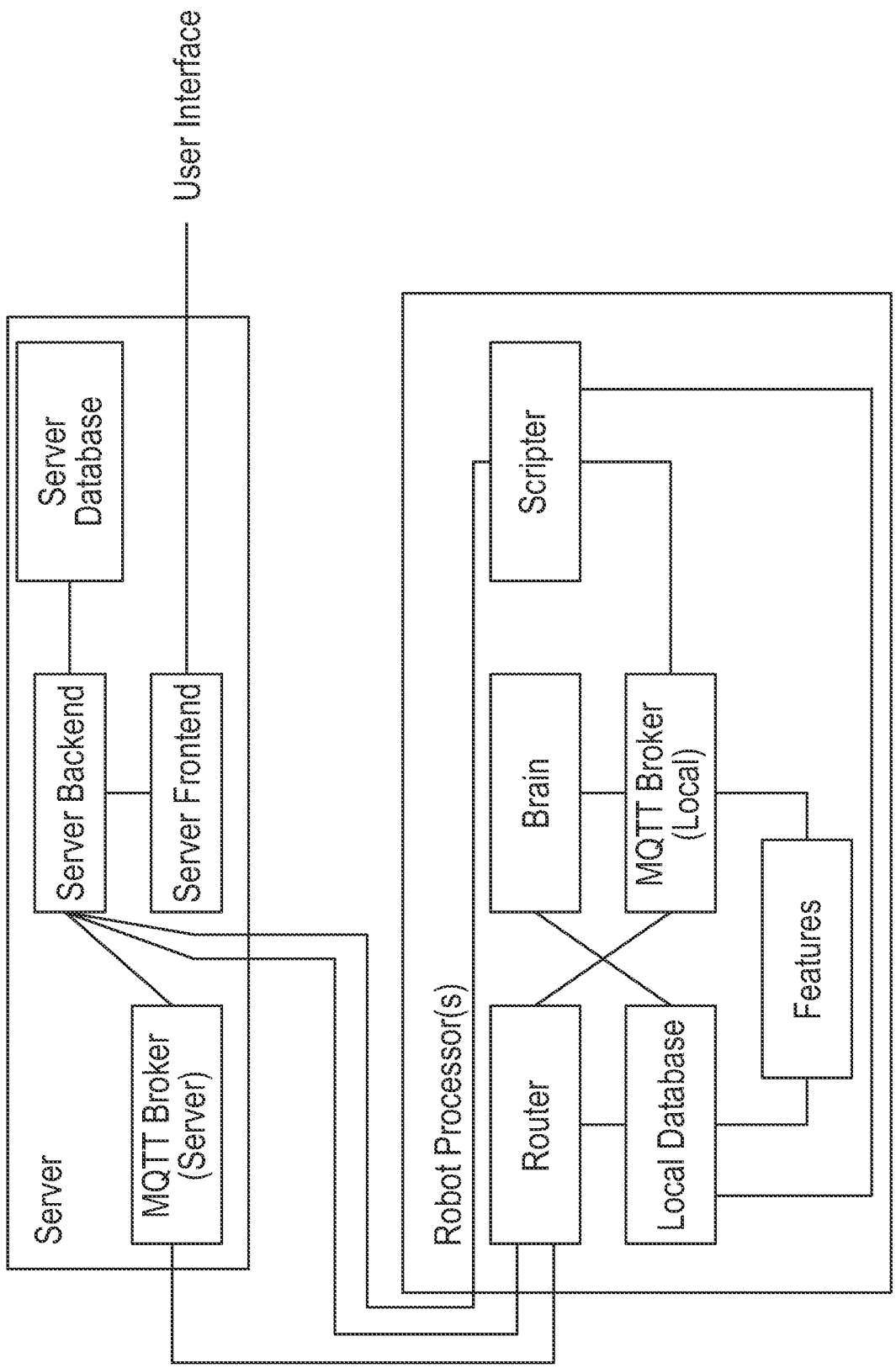
FIG. 1 shows the basic operational software architecture.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In a basic embodiment, the Invention constitutes method of using an intelligent, multi-function robot having and using internal Artificial Intelligence and functioning autonomously when not connected to external Artificial Intelligence, comprising the steps of: during a pre-initialization process or an initialization process prior to autonomous operation of said robot downloading from a server when the robot is online the functionality and data required for the robot to perform a particular task; during autonomous operation of the robot, said robot not using the external server or the external Artificial Intelligence; running software natively on the robot itself and the hardware processing the software is on the robot itself, and wherein data stored on the robot consists only of that necessary for performing preconfigured functions; limiting on board hardware processing power consists only of that necessary for performing the preconfigured functions; and adapting the robot for autonomous movement within a defined premises.

In a preferred embodiment, the robot being initialized to perform the task or tasks it is designed for only. Preferably, the preconfigured functions being selected from the group Artificial Intelligence (AI), communication with users, navigation, following users, recognizing individual users through voice and audio recognition, generating maps.

According to another aspect of the invention, the Invention constitutes an intelligent, multi-function robot capable of autonomous movement and comprising multiple functional modules, wherein a brain, a router, and functional features of each module operating in its own isolated, virtual environment container. Further, each module running an independent script packaged and deployed in its own isolated, virtual environment container. The functional features including navigation, image processing, audio processing or video processing.

According to another aspect of the invention, the Invention constitutes a server to manage a plurality of robots, each robot performing a specified set of tasks, the server comprising: a robot management table listing per robot tasks and associated scripts according to a unique robot ID for each of said plurality of robots; an operational database to store operational data required to run the scripts; a preprocessor to run at least one algorithm to obtain and update said operational data; and an initializer to initialize a particular robot according to its unique robot ID with its associated said scripts when the server is in network communication with that particular robot.

Another aspect of the invention constitutes a method of programming an intelligent, multi-task robot to use internal intelligence and to function autonomously when not connected to an external server, comprising the steps of: during a pre-initialization process or an initialization process prior to autonomous operation of the robot, dividing processing into low resource processing tasks for the robot and high resource processing tasks for the external server; initializing the robot with its low resource processing tasks, wherein the low resource processing tasks provide internal intelligence; during autonomous operation of the robot, the robot using the internal intelligence and not utilizing the server for external intelligence; wherein data for the internal intelligence stored on the robot consists only of that necessary for performing preconfigured functions.

Preferably, on board hardware processing power consists only of that necessary to provide said internal intelligence. Further, the robot is adapted for autonomous movement within a defined premises. Low resource processing tasks comprise functional features, each of which operates in its own isolated, virtual environment container. One of the low resource processing tasks runs an independent script to operate said functional features. The functional features comprise navigation, image processing, audio processing or video processing.

According to another aspect of the invention, the Invention constitutes a robot for performing a predefined set of tasks, each task having multiple features, the robot comprising: a scripter to download, according to a unique ID number of the robot, a script and multiple virtual containers associated with the unique ID number from a server in communication with the robot, wherein one of the multiple virtual containers is a router to communicate with the server to download a subset of operational data to support the multiple virtual containers, a second one of the multiple virtual containers is a controller to control the robot according to the script, and each of the remaining virtual containers to perform one of said multiple features; and a robot database to store the subset of operational data, wherein the scripter operates when the robot is online with the server and said controller operates when the robot is offline from the server.

FIG. 1 shows the basic operational software architecture.

Robot Processor(s): A processor manages instructions, such as arithmetical, logical, input/output (I/O), and other basic instructions. The processor used herein in a preferred embodiment, as a non-limiting example, is 1 Xavier and 1 Nano, but alternative configurations and components will also work including 1 processor or many processors. Processors from any company or custom-made can work.

To effect the herein invention, the processors are generally larger and more costly than the average processor of a similar robot that operates using a server, as the server can offload much of the strenuous processing that would normally fall on the robot's processors. As the herein disclosed robot operates offline, that cannot be done. Accordingly, the processors of the robots of this invention are much smaller than the average server processor, as you cannot fit an entire server processing unit onto each robot at any reasonable size or cost-effectiveness. Therefore, the processors are larger than the average online robot and smaller than the average server processor.

Further, much of the strenuous processing that would normally fall on the robot's processors is offloaded. Thus, the server is not used during operation, but through the therein disclosed system of pre-initialization and initialization, the server is used prior to autonomous operation. By using the pre-initialization process and the initialization process, you can offload the processing to an earlier point in time and reap the benefits during operation.

Router: A router is a device that connects two or more packet-switched networks or subnetworks. It serves two primary functions: managing traffic between these networks by forwarding data packets to their intended IP addresses and allowing multiple devices to use the same Internet connection. The router must pull down the data that the server prepares for it. Once it gets the data, it sends it to the brain and the brain does the rest. It is also responsible for sending the IAmAlive PING signal, as hereinafter explained. Any reference to a decision made or action taken by the router may refer to the router's own intelligence or decision-making capability or, alternatively, it may refer to the router performing actionable commands originating from another docker, such as the brain or scripter Brain: The robot consists of senses and abilities. These may be, but are not limited to:
Speech recognition
Natural language processing
Vision
Ability to move
Ability to talk
User interface on the robot screen/face.

The role of the brain is to manage these senses and abilities and to provide a 'world' whereby the robot can function. The brain fulfills the functional specification of any given robot.

As an example, in a clinic assistant robot, the role of the robot is to register patients, take vitals, escort the patient to an examination, and then assist the doctor during the examination. The brain in such as example manages all the components described above so that the robot can fulfill this functional specification. The brain creates a closed and defined world for the robot to exist in.

Local Database: a database is an organized collection of data stored and accessed electronically. A local database is simply a database the robot can access on the robot itself. As an example, a memory module, a hard disk drive (HDD), a solid-state drive (SSD), etc. Before initialization, any pre-existing data or software on the robot is stored on the local database. For the robot's initialization phase, the robot connects to the server, downloads a subset of the software and data from the server database, and stores it locally on the Local database. The local database holds data with information on the features required for operation and can be directly accessed by the features. Any data or software that the robot handles at any point may be stored on the local database.

MQTT Broker (local): the MQTT broker, as known in the industry (see https://mqtt.org/), enables MQTT clients to communicate, specifically local MQTT Brokers in this case. This can be a Self-Hosted MQTT Broker or a managed MQTT Broker.

Features: The feature set is the set of functions of the robot that must achieve operation. This may include:
  Navigation: currently operated on ROS. The ability to autonomously move around an environment with intention and intelligence
  Image Processing: responsible for object recognition, face recognition, OCR (optical character recognition), etc.
  Audio Processing: responsible for audio recognition, voice matching, NLP, STT, TTS, etc.
  Faceup: responsible for UX/UI, Display, touch screen, responses to user input, etc.

The features take data required to operate from the local database. Examples of features taken are navigation: maps, location names; image processing, recognized people and objects; audio processing, recognized voices and words; and FaceApp, screens.

Scripter: The scripter is responsible for managing the downloading and execution of the dockers that comprise the robot's features.

The brain, the router, and each of the features run in a virtual environment container, called a docker. Instead of each module running as an independent script on the robot's machine, they, and all their dependencies (like external libraries), are packaged and deployed in their own isolated container. This allows for the Scripter to generate a single script, running straight on the robot's machine, to manage the deployment and version control of all the robot's modules. Using docker commands it can, for example, shut down or power on modules as needed or check to see if the current version of a docker is the most up-to-date and perform an update if needed. When an update is available from the server, the server pings the router, which then sends a message to the scripter with the names of the dockers that are to be updated. The scripter then uses API (see https://aws.amazon.com/what-is/api/) calls to download the updated dockers from the server. Once the dockers are downloaded the scripter communicates with the brain to determine the best time to restart the updated dockers.

Robot Server: A server is a computer or system that provides resources, data, services, or programs to other computers, known as clients, over a network.

The server is also an administrative portal, through a user interface, that facility administrators can use to manage their data (As an example of the clinic, the administrator can add users, user info, and status, for example doctors and nurses, through the portal. A doctor can then be assigned to an examination room as their shift comes up).

Another example is the entire face recognition algorithm. All the heavy work is done by the Server administration portal. Users upload pictures of a user; the server then processes those pictures and converts them to vectors that can be used for face recognition in the robot. After this is done, these vectors are downloaded to each robot during the initialization or update states.

MQTT Broker (server): In a preferred embodiment, an AWS IOT MQTT (Amazon Web Services, Internet of Things) Broker is utilized, but other MQTT Brokers may be used as an alternative.

Backend: Simply put back-end is where the technical processes happen. "Back-end development refers to the development of server-side logic that powers websites and apps from behind the scenes. It includes all the code needed to build out the database, server, and application." Pre-initialization and update processing happens here.

Frontend: Simply put frontend is where the user interaction happens. Pre-initialization and updated information inputs happen here through the user interface.

Server Database: an organized collection of electronic data. The data stored here comprises, but is not limited, to faces, people, authority status, objects, maps, location names, recognized words and phrases, customer data, or any other robot operation data required or helpful for the robot and its function to operate properly.

User Interface: Via the portal of a web page or phone app or any appropriate means of a user interface, a user inputs personalized data the user would like the robot to have to operate properly as they see fit.

Data Setup and Pre-initialization: The initialization phase has the required/wanted/needed data for the robot and the required/wanted/needed data from the customer uploaded to the robot from the server. This data needs to be preinstalled on the server for it to be ready for the initialization process. During this data setup or pre-install phase, you may add any robot standard functions, or specific robot function the customer requires, and add the customer's requirements like, for example, robot environment, staff, and other known robot users to recognize, maps, location names, robot environment restrictions (ex. robot not allowed in the stairwell, custodial closet, etc.), etc. This may not have a specific order. As an analogy, the pre-installation phase is like a conversation between the robot installer and the customer on what information the robot will need to work effectively to fit the customer's wants and needs in addition to any baseline data that may be downloaded during the initialization process. Once the data is selected and gathered (for example, for face recognition images of the recognized users will need to be taken) it will be uploaded via the user interface by the server frontend. Any data that requires processing will be processed on the server back-end with the resulting data stored on the server database.

Each robot preferably is given a unique robot ID. The data's location is then linked to the unique robot ID (no specific way thus far although standard practices known in the art exist for example a list of pointers or structs) ready and waiting for initialization to happen. The Robot ID may be unique by using something as simple as an iterating number or use a more complex means of generating a unique number. Note: the data downloaded into the robot during the initialization phase may not be unique, unlike the robot ID which always will be unique. For example, a customer with two robots with two different unique robot IDs may exist downloading similar or identical data as the robots may be used in the same environment.

Robot Server Communication: The Server and the Robot must be in communication under three circumstances: Initialization, updates, and IAmAlive PING. To be in communication with one another the robot comprises a server communication device and a router.

IAmAlive PING: used to check the reachability of a host using echo request and echo replay messages. The ping tool is used to check the connection between the sender and the host. The server, to know which robots are connected with the server, requires the robots to send an IAmAlive ping. This IAmAlive may preferably be sent every 5 minutes, but many other timeframes are possible, like every hour, 10 minutes, 1, minute, 1 millisecond, etc. This allows the server to be aware of all robots connected to it for communications, such as updates.

Initialization: the process starts with the robot brain checking the local database. As the robot has not been initialized yet, the local DB is absent of key information and data. This is a trigger for the brain to initiate the initialization process. The robot uses its unique robot ID and through the router connects with the server. The router performs an API request using the provided robot ID to begin acquiring data from the server. Part of this data includes a company ID that is stored on the server and is used to delineate to which company a robot belongs and which datasets should be linked to the robots of that fleet. The router then makes subsequent API calls using the robot ID and company ID to complete the data initialization process. The server, already knowing the correct data associated with the robot ID from the data setup process, sends the requested data to the robot via the robot router.

The robot downloads the data and stores this data in its local database. Once the robot has this data, it can access the data locally on the local database and no longer requires the server for operation bar updates and the IAmAlive PING.

Updates:

Server Side: If the information discussed in the data setup state or any further data is required to be updated, then the update process occurs. If the updated data is customer data, the update process first requires the customer to add or subtract any data in the system via the user interface (ex. a new staff member joins and face recognition photos are required, a user leaves and is no longer required for face recognition and face recognition photos are requested to be deleted, remodeling occurred, and maps and location names need to be altered, etc.). This will be similar to the data setup pre-initialization phase. The server then will need to notify an update is required to all robots whose robot IDs fall under the purview of the information update, in whole, and in part. Thanks to the IAmAlive ping, the robot knows which robots are currently connected to the server and which of those have robot IDs associated with the data update, in whole or in part. The server then sends out an update message to all robots that are currently connected to the server and which of those have robot IDs associated with the data and/or software update (and eventually reaches all robots that are not yet connected to the server when they eventually connect to the server). The server administrator can decide when the update will occur or the robot's internal AI will download the update at a point where the robot is connected to the server and has downtime between tasks, or some combination of both. The update will have the server data on the database sent via the router and stored locally on the local database, similar to the initialization process.

Robot Side: An AI or state machine system will determine that the robot may require or be aided by a set of code that is not currently installed on the robot. This trigger can be done for example by the robot's performance being below a threshold at any time or a set number of times in whole or on average. A trigger may also be if the performance of a task is suboptimal or incomplete or failed. Alternatively, a trigger may further comprise a large amount of time passed since a previous update. An example of a trigger may be the robot encountering a blockage during navigation that prevents it from reaching its desired destination or repeatedly failing in speech or voice recognition. The robot can determine on its own end if there may be an additional script or docker, or general information required on the robot's end that may be available on the server's end. The robot can initiate a request to the server when connected to the internet or next connected to the internet to receive an update from the server. The scripter or router can download said code and/or data in a similar process to the one described for the server side update, except the API calls to download from the server may include the information for this brand-new code in addition to an updated version of previously installed code. The scripter and the brain may then communicate to determine the best time to reboot the robot.

Component Connection List: (without Duplicates)

Router—Local DB: The router sets up and manages the local DB. It can take the robotID from the localDB during initialization for API calls. For its MQTT communication, it takes the Robot ID and the Company ID from the Sever DB. The router is the intermediary between the server and the robot processors, where data is uploaded to the local DB, where the data is stored for access by the router, brain, and features.

Router—MQTT Broker (local): The router uses the local MQTT broker to communicate with the brain and the scripter. The router tells the brain when the local DB has been updated, sends patient registration forms to the brain, sends reboot commands (comes from the server, brain executes reboot), and executes "I am alive" with the brain. It also tells the scripter to update docker software. The brain sends the router an initialization command when it sees the local DB has not been set up yet.

Scripter—MQTT Broker (local): The scripter uses the MQTT Broker to communicate with the router and the brain to know when to download new dockers and reboot the robot. The router tells the scripter when new dockers are available from the server, and the brain tells the scripter when the robot is ready to reboot.

Scripter—Local DB: When the robot boots up, the scripter will access the local DB to check if the dockers have been initialized yet. If not, the scripter begins initialization. During initialization, the scripter accesses the local DB to get the robot ID, which it needs to perform API calls. The scripter can store the software it downloads on the local DB.

Scripter-Server Backend: Any time the scripter downloads new software for the robot, the scripter accesses the server backend via API calls. During initialization, the scripter presents the server with the robot ID, to which the server already has associated a feature set, which the server then instructs the scripter to download.

Router—MQTT Broker (server): The router uses the server's MQTT broker to receive update notifications and data that it passes on to the brain. Update notifications can be for the local DB, for software, and data can be for registration forms. Reboot commands are also sent over the server MQTT.

Router—Server Backend: API calls done for "I am alive," and to retrieve data that the router stores in the robot's local DB. The router can also update the server with new data via the server backend.

Local DB—Features: Features access the data they need to operate from the local DB-like for example face vectors for face recognition, maps/location names for navigation, and user data for telepresence.

Local DB—Brain: Brain accesses data on local DB that it needs for commands—map locations to send as a destination for navigation.

Brain—MQTT Broker (local): Brain communicates with all features via MQTT and performs "I am alive." It sends commands to and receives status updates from all features.

Brain—Server Backend: (connection not shown.) This is an optional connection to increase the speed of certain data downloads and uploads.

MQTT Broker (local)—Features: Features use MQTT to receive commands from and give feedback to the brain. For example, goal endpoints for navigation, words to pronounce for speech to text, and screen transition for faceapp (a UI).

MQTT Broker (server)—Server Backend: Pass update notifications and selected data from server to router.

Server Backend—Server Frontend: The server frontend transfers data received by the user interface and uploaded by the developers to the backend, where it can be transferred to the router via MQTT and API calls or stored on the Server DB.

Server Backend—Server DB: The Server DB stores data that can be accessed, processed, added, or deleted by the Server Backend.

Server Frontend—User Interface: Developers or customers input data like map data, face vectors, and robot id, to the server.

Figure 2:
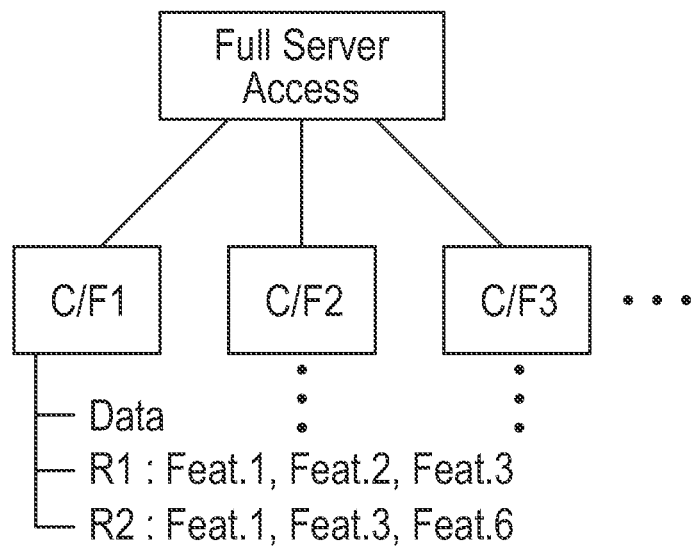
FIG. 2 shows the Server-Side Structure.

FIG. 2 shows the Server-Side Structure.

The server structure will comprise an organized method to store and access the data and software for all the robots for all companies or facilities. This server structure may be a single server or multiple servers in communication. At the highest level, there is full server access. This can be held, for example, by the administrators and technical staff operating all the robots. This level may have general data that is shared by all robots. Below that level, there may be a company level. This may instead be a company/facility level if they are one and the same. Each company will have a unique company ID, which will point to a collection of the database data (see local database) common to all robots of that company, a set of facilities if required, and a set of robot IDs that each denote a particular robot in the company. Examples of Company data may be a company logo to display on the FaceApp, company applications, company policies and standards, company staff, etc. At a lower level, there is the robot level. This may include the unique robot ID and robot-level data. Examples of robot-level data may be, for example, a robot name, and diagnostics or performance data. Each robot ID will point to a set of features. The robots may each comprise a different, similar, or identical set of features. Each feature will have a set of feature requirements, which are the dockers that the features need to function. Currently, each feature only needs its own docker but there may exist features that require multiple dockers to operate or require multiple docking to operate at a higher efficiency or effectiveness. For example, navigation may rely on image processing for obstacle avoidance. These features to docker dependencies and the level of said dependencies are stored in a feature requirements list. This allows the robot initialization to know exactly what features go where and what data to download during the initialization process. It also allows the proper allocation of dockers to each robot depending on the robot's intended function.

This may have applications for improving performance and cost. For example, downloading and operating all dockers on every robot may overload and even fry the CPU or require a much larger and more expensive CPU to function. It is much more efficient and cost-effective to have each robot only running the dockers it needs for its specific function, rather than all of the software as a package deal.

Figure 3:
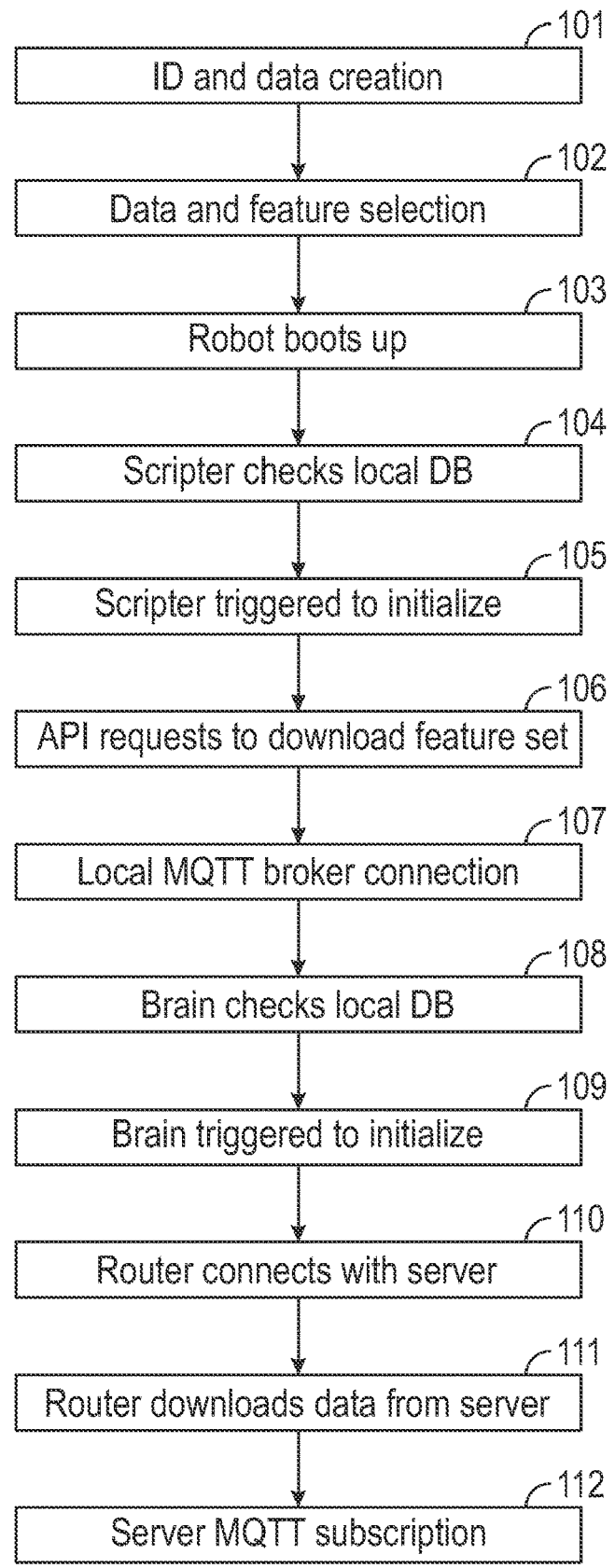
FIG. 3 shows the Flowchart for Initialization.

FIG. 3 shows the Flowchart for Initialization.

Data and ID Creation (step 101):

Robot is given a Robot ID, API URL, and MQTT broker information for the local and server brokers. It may also be given MQTT broker information for the local and server brokers or, alternatively, this is provided by the scripter pulling this information in step 6.

Customer uses user interface and uploads a dataset to the server database done through the path of the server frontend and the server backend.

this dataset may be associated with a Company ID.

The Robot ID (step 102) is associated with a chosen feature set and/or subset of data from the dataset created in the prior step.

The robot is started up/booted (step 103). Additionally at any point up to and including this step the robot can be assembled and have its smart connections initialized.

The scripter checks the local DB. A certain part of the local DB is empty—fields/files/folders should be non-zero if the robot has already been initialized. The empty/non-existent fields indicate that the robot has not yet been initialized.

The scripter is then triggered to start the initialization.

The scripter already has the robot ID, as well as a URL, from local storage on the robot and uses them to perform API requests to the server and download the required feature set. This may include the router, the brain, and the MQTT broker (local).

All processor modules that require a connection to the local MQTT broker (step 104) do so using the information loaded in step 1.

The brain checks the local DB (step 105)

A certain part of the local DB is empty, fields/files/folders should be non-zero if the robot has already been initialized. The empty/non-existent fields indicate that the robot has not yet been initialized.

The brain is then triggered to start initialization (step 106).

Brain sends an MQTT command to the router to begin the initialization process

Router begins the initialization process with the server (step 107).

Router already has robot ID as well as a URL from local storage on the robot and uses them to perform API requests to the server.

Router gets company ID from the server as part of the first data set pulled from the server DB via an API request.

Subsequent API requests (step 108) using the robot ID, company ID, and URL are made to build the robot's local database (this step may happen before, during, or after step 9)

The router downloads user info specific to the robot comprising, but not limited to, face vectors, map info, etc. into the local database.

The data received from the server contains a timestamp of when it was uploaded to the server, which the router stores onto the robot's local database for future reference during updates The router pings the brain via MQTT that the local database has been setup Router uses robot ID and company ID to subscribe to MQTT topics (step 109) coming from the server and begin IAmAlive signal with the server (this step may happen before, during, or after step 8).

Update notifications and data are sent to the router via MQTT (in a queue)—any queued update notifications will be received at this point.

The router initializes IAmAlive with the server, which uses API calls.

Feature set pulls necessary data directly from local DB (step 110) (this step must happen after step 8 but may happen before step 9).

I am Alive PING with Server

The robot must first undergo the initialization process past step 7 in the process described above.

The router begins an internal clock that will ping the server via an API call at a pre-set interval (once every 2 minutes or 5 minutes, etc.)

At each interval, the router uses the robot's robot ID as well as the provided URL to perform an API call to the server, letting the server know that the robot is online The clock runs in the background and does not affect the normal functioning of the robot.

Data Update from Server

Figure 4:
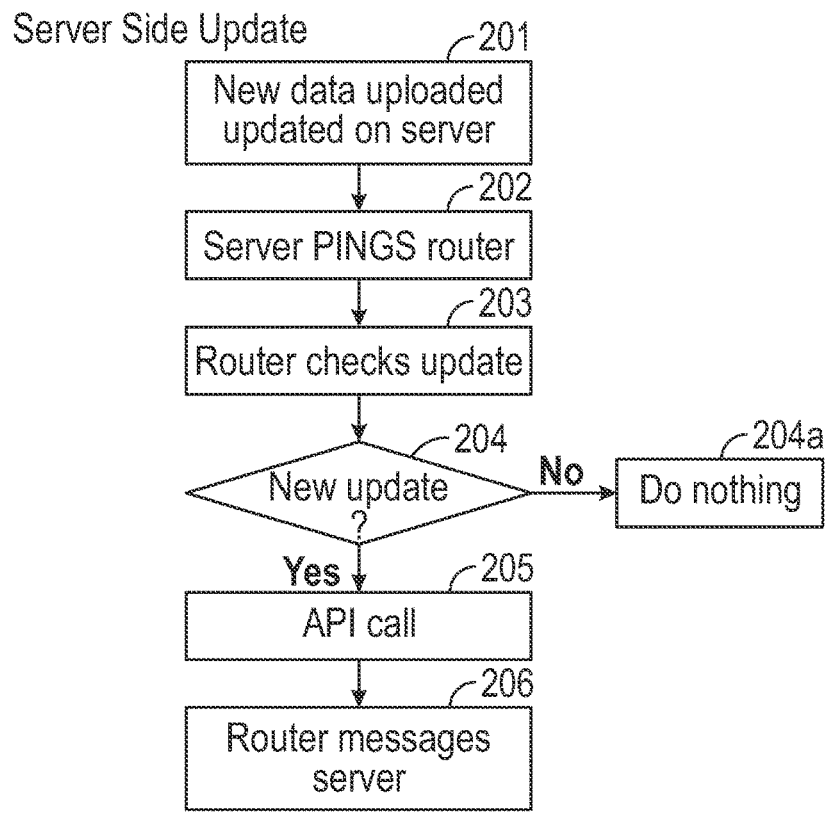
FIG. 4 shows a flowchart of the Data Update from the Server.

FIG. 4 shows a flowchart of the Data Update from the Server.

The robot must first undergo the initialization process past step 9 in the process described above.

New data and/or software for the robot is uploaded (step 201) by the development team or user to the server (may happen before or after step 1).

The server pings the router (step 202) via the server MQTT broker that an update is available. Note that the pings for software versus data updates may be done on different MQTT topics, so the router automatically knows which type of update is happening.

The router checks to see if the update is new or if it already has the data (step 203)

The update notification contains a timestamp of when the data was uploaded to the server. The robot checks (step 204) this timestamp and compares it to the timestamp stored in its local database. If the timestamp in the notification is more recent than the timestamp in the database, the update is new and the robot proceeds with the update process and moves on to step 5. If not, the update is canceled.

If the update is a software update, the router then pings the scripter to perform the update. After the API calls, the scripter pings the router and then the router pings the server.

If the update is a data update, the router performs the same API calls (step 205) as described in the initialization process and writes the new data to the local database.

The router may be optimized so that it will only download new data and not re-download the old data it already has.

The router takes the new timestamp from the data update and writes it to its local database for reference during future updates.

The router sends an MQTT message to the server and/or the brain that the update is complete (step 206).

Data Update from Robot

Figure 5:
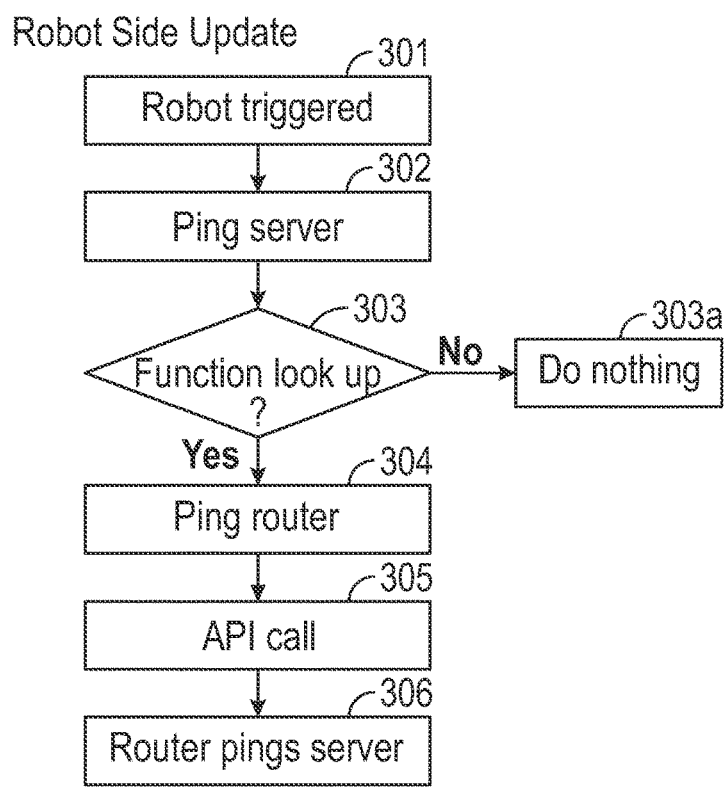
FIG. 5 is a flowchart showing the Data Update from Robot.

FIG. 5 is a flowchart showing the Data Update from Robot.

The robot gets triggered to check for an update (step 301). See "Server Robot Communication" above.

The robot sends feedback to the server with information regarding the trigger (step 302). This may be, for example, the nature of the task (navigation, image processing, etc.), the time, and the location of the failure. Alternatively, the robot may analyze its own performance and request a specific software or category of software from the server.

Once the failure data is collected by the server, the server side can use this data to determine which if any new software may be appropriate for the robot to download. (step 303). This decision can be handled by either a human operator working on the server or AI software on the server itself. If the robot is requesting software that it has already determined that it needs, the person or AI operating the server will check if any such software is available.

The server has a repository of all available software for the robot. If the person or AI on the server side cannot identify any appropriate new software for the robot to download from within this repository, then the update is canceled. The conditions for the search are determined either by the robot's request or by the server-side analysis of the robot's trigger. The scripter can download said code in a similar process to the one described for the software update, except the API calls to download from the server may include the information for this brand-new code in addition to an updated version of previously installed code. The scripter and the brain may then communicate to determine the best time to reboot the robot.

The robot checks if the update is software or data,

If new software is available, then the server pings the router (step 304) via the MQTT broker (server) with the information about said new software.

The scripter performs API calls (step 305) to download the new software, using the information received in step 4.

The router pings the server and/or the brain (Step 306) to let it know that the robot has now downloaded the new software.

Docker is an open-source platform for building, deploying, and managing containerized applications. AS defined by IBM, Docker is an open source platform that enables developers to build, deploy, run, update and manage containers-standardized, executable components that combine application source code with the operating system (OS) libraries and dependencies required to run that code in any environment. Containers simplify development and delivery of distributed applications. They have become increasingly popular as organizations shift to cloud-native development and hybrid multicloud environments. It is possible for developers to create containers without Docker, by working directly with capabilities built into Linux and other operating systems; but Docker makes containerization faster, easier and safer.

Docker architecture exists in the art, commercially available from docker.inc. Dockers provides the ability to package and run an application in a loosely isolated environment called a container. The isolation and security allow the running of many containers simultaneously on a given host. Containers are lightweight and contain everything needed to run the application, so do not need to rely on what is currently installed on the host.

Containers are made possible by process isolation and virtualization capabilities built into the Linux kernel. These capabilities-such as control groups (Cgroups) for allocating resources among processes, and namespaces for restricting a processes access or visibility into other resources or areas of the system-enable multiple application components to share the resources of a single instance of the host operating system in much the same way that a hypervisor enables multiple virtual machines (VMs) to share the CPU, memory and other resources of a single hardware server. As a result, container technology offers all the functionality and benefits of VMs-including application isolation, cost-effective scalability, and disposability-plus important additional advantages: Lighter weight, Improved developer productivity, Greater resource efficiency.

Initialization of robots (i.e., the software and data required to operate the robot) may be implemented using virtual containers such as those provided by the above mentioned docker architecture. A virtual container may be considered a subset of a virtual machine and the initialization process may use pre-defined virtual containers to run the robot. Use of virtual containers provides a modularity of task elements in order to provide the required functionality.

Dockers are a kind of "virtual container," which is a small simulated operating system that contains all the dependencies for a specific piece of code to run. The dockers do not run directly on the robot's hardware, but instead each operates according to its own virtual operating system. They, therefore, need to be initialized by another piece of code that is actually running on the robot's hardware, in this case the scripter. Each feature (face recognition, NLP, OCR, etc.) has its own docker.

The brain is the decision maker and is versatile/malleable in both performance or task function (can be specialized).

For purposes of describing the herein disclosed invention, a script is a code run by a specific scripter, telling it which set of software packages (dockers) to retrieve from the server on initialization. The scripter is like firmware in that it is the only code that is running directly on the robot's hardware. All other code is run in a virtual container (docker) and can be compared to an Operation System (OS) like windows, macOS, Linux, etc.

It will be appreciated that a script may contain the code/software that defines a task. For example, a robot may be designated as having a job as a clinic assistant robot. The role of the robot may be to register patients, take vitals, escort the patient to an examination, and then assist the doctor during the examination.

A script therefore might define the tasks of a "clinic assistant robot". It will be further appreciated that a single task may require certain features. For example, in order to escort a patient to an examination room, the script may control the mobility of the robot, but the robot must have correct navigation maps of the area downloaded in order to move correctly within the defined premises and may also require some form of object recognition capability to prevent it from crashing into objects. In this scenario, the ability to navigate and object recognition may be considered the features required for the task.

Currently, the script is hard-coded onto the scripter, meaning the scripter comes pre-loaded with the set of which dockers to pull from the server during initialization. However, in the future this may be soft-coded, meaning that the robot can start even without knowing the set of features it is supposed to download. In initialization, the scripter can present its robot ID to the "initializer" on the server, which knows (according to the robot ID) the script that that robot is supposed to have. Once the scripter receives the script, it can then begin to download and launch the set of dockers detailed in the script. Once the dockers are launched, the router (one of the dockers) completes the initialization process by downloading the data necessary for that robot's function. The soft-coded option may also affect the router's initialization, for it should only download data relevant to the robot's specific feature set (for example, it should not download maps for a robot that does not have navigation). Once the scripter receives the script with the set of dockers that it must download, it may need to pass that list to the router, so that the router will know exactly which data it is supposed to pull from the server. Alternatively, the selection of data downloaded by the router can be handed by the "initializer" on the server, much like how it works for the scripter. The router can present its robot ID to the initializer and the initializer can tell it which data to download.

Soft-coded scripts can allow developers to choose remotely (via the server) which feature set a robot should have, rather than having to hard-code the feature set onto the robot during manufacture.

The scripter communicates with the brain about when to reboot. When the scripter downloads a software update, it needs to reboot the robot before the new software can actually run on the robot (like restarting a phone or computer after downloading a OS update). Before doing this, it communicates with the brain to find an ideal time to restart, making sure that it does not stop the robot in the middle of an important task.

When the reboot is just powering off and on, it does not affect data.

The robots may operate collectively when connected to the server. For example, if several robots in a facility have a number of tasks to do, they can, for instance, upload those tasks to the server into a facility-level or floor-level task queue, where upon receiving the tasks the server can order and categorize the task and send them back to the robot more appropriately to optimize efficiency.

The server has much more processing power than the hardware on the robot. A typical server processor may have between 0.5 and 6 TB of ram, while the robot's CPU can be expected to have 1-64 GB.

At least at one point during the process of initialization, the robot must be connected to a server and must be connected to the server at least at one point during the process of update. The robot may optionally be connected to the server at any point and, if so, perform the IamAlive PING so the server may know of this connection. Outside of these times, the robot does not need to connect to a server in order to operate according to its functional requirements.

The Level of detail hidden within the robot ID—company ID, facility ID, robot ID, Task ID, category ID level of detail in 1 ID or multiple IDs or all grouped and associated with the 1 ID or multiple IDs.

The robot ID may hold more information than a simple 001, 002, 003 . . . . It may be a more complicated number or ID that within it contains information on the use of the robot, so a server or human can match specific functionality or features to the robot by parsing the robot ID. If implemented, this may improve the performance of the initialization process. This parsed robot ID may be referred to as containing CompanyID, Facility ID, Floor ID, Task ID, Category ID, category ID level of detail in 1 ID or multiple IDs or all grouped and associated with the 1 ID or multiple IDs.

For example, if the robot ID is a 64 bit code or multiple sets of code:
the first set of digits (or first code) can be representative of the company for which the robot is intended;
the second set of digits (or second code) can be representative of the facility for which the robot is intended;
the third set of digits (or third code) can be representative of the floor for which the robot is intended;
the fourth set of digits (or fourth code) can be representative of the category of work for which the robot is intended;
the fifth set of digits (or fifth code) can be representative of the tasks for which the robot is intended;
and so on.

Updates:

Server-Side Versus Robot-Initiated Update.

The server will need to know by robot ID which updates will be relevant for which robot and by company ID if customer data has been updated. If a more detailed robot ID is used as described above, the server will have a general means of parsing which robots are affected by which updates.—see the example of companyID, facilityID, robotID, TaskID, CategoryID level of distribution listed above. For example, if a company logo is changed, it will affect all company ID robots. If a remodel of an office has been made, it will affect all Facility ID robots. If a procedure has changed it will affect all related Task ID robots. Etc.

Alternatively, or in addition to the above, the robot may know via its own analysis which type of update to request from the server. For example, the robot will know what dockers and data it requires and know to only receive the appropriate updates accordingly.

New Description for Updates.

Whenever a data or software update is available, the server sends the router a message that includes information about the date/time the update occurred, and the nature of the update (if data, which type of data; if software/dockers, which docker is to be updated). In a software/docker update, the router passes the information it received from the server to the scripter, which downloads the new docker accordingly. If it is a data update, the router handles the update itself. Router is for data, scripter is for software Robot can update the server with new data. The robot will be able to update the database with new data that it gathers while in operation (face recognition data, map data, user profile information, etc.) using API calls. This data may be stored in a location on the database that can be accessed by other robots in that company or facility, as described in the details of company ID, facility ID, robot ID, etc. Different types of data may be designated for different levels of access, which can be determined by the customer or development team. For example, a company may want to enable access to new face recognition data for only robots at a specific facility, or for all robots across all facilities for that company.

Relationship Between Features and Tasks.

Breakdown of tasks into features. For example, the "receptionist" task is a high-level concept that may require the features of speech-to-text, OSR, image recognition, and interaction with a database. In development, focus is on perfecting a set of features that are deemed essential for the functionality of the robot. Any higher-level task that an end customer might want to see the robot perform in their facility will be broken down into these smaller features.

During the initialization process, the robot downloads a set of dockers that each enables a specific feature. During actual operation, the robot will use these features to perform the desired tasks.

Task-level descriptions help customers select what functionality they want for the robot. Features are the actual dockers/code. When customers order a robot, they are presented with their options in terms of the tasks that they would want the robot to perform.

Pre-Initialized VS Post Initialized Robot Processor:

Pre-initialized just has the scripter and local DB and robot ID in order to minimize the amount of software that will be on the robot before initialization. This will allow for the most flexibility and efficiency in distribution, as the feature set of a robot can be determined remotely rather than being hard-coded into the robot. In theory, 3 identical non-initialized robots can end up being initialized for 3 entirely different functions. All that a robot will be given (hard-coded) before initialization is its robot ID, the scripter, which downloads the selected feature-set onto the robot, and the local DB which stores all of the downloaded software and data locally on the robot.

Post initialization has the actual dockers for full functionality. Once initialization has been completed, the robot will have a full feature set. The scripter will have downloaded all the dockers necessary for that feature set and the docker will have downloaded all data required for the dockers to function.

Figure 6:
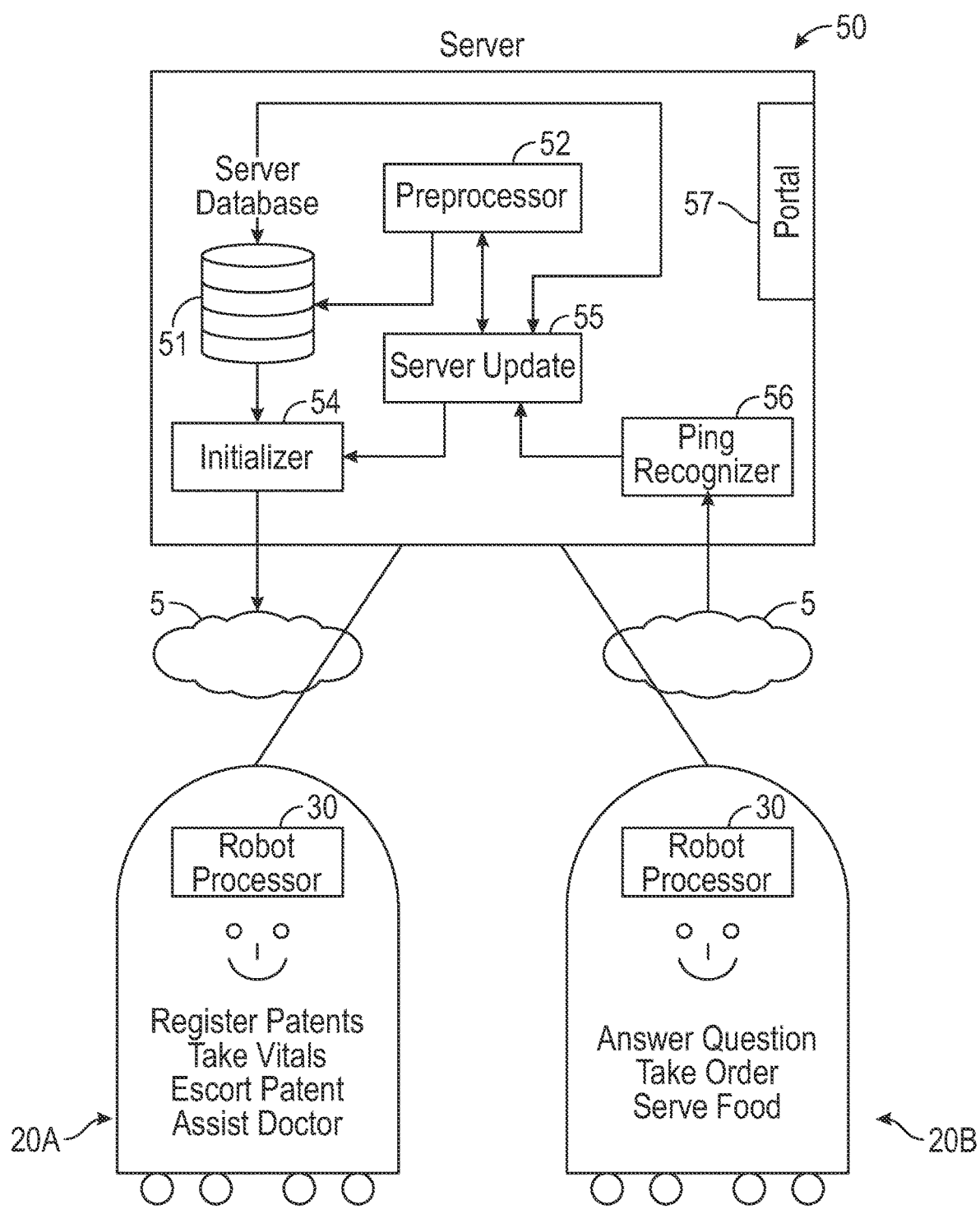
FIG. 6 is a schematic illustration of a system for initializing a robot to function offline; constructed and operative in accordance with a preferred embodiment of the present invention.

Reference is now made to FIG. 6 which illustrates a system 100 for initializing and updating an offline robot according to an embodiment of the present invention. System 100 may comprise a server 50 capable of communication over a network connection 5 (such as the Internet) with multiple robots 20. Shown are two robots 20A and 20B, each assigned with a different set of tasks, although in some embodiments they may perform the same tasks. Robot 20A may be a clinic assistant robot tasked with registering patients, taking vitals, escorting the patient to an examination room and assisting a doctor. Robot 20B may be a service industry robot, tasked with taking orders from customers, answering questions about the menu and serving food. It will be appreciated that such robots may also comprise accessories such as microphones, speakers, cameras, and sensors for communication and taking readings and other hardware accessories required for performing their tasks such as an arm for dispensing medication or serving food.

The example of the clinic assistant robot will be used as the representative robot. This robot set up may be provided by a clinic administrator and that robots 20 may interact with patients. In other embodiments, other types of robots and users may also be used.

The system 100 may have an organized method to store and access the data and software for all robots 20 for all companies or facilities. At the highest level, there is full server access. This can be held for example, by the administrators and technical staff operating all the robots. This level may have general data that is shared by all robots. Below that level, there may be a company level. This may instead be a company/facility level if they are one and the same. Each company may have a unique company ID, which points to a collection of the database data common to all robots of that company, a set of facilities if required, and a set of robot IDs that each denote a particular robot in the company. Examples of company data may be a company logo to display on the robot interface, company applications, company policies and standards, company staff, etc. At a lower level, there is the robot level. This may include the unique robot ID and robot-level data. Examples of robot-level data may be, for example, a robot name, and diagnostics or performance data.

Server 50 may further comprise a server database 51, a preprocessor 52, an initializer 54, a server updater 55 a ping recognizer 56 and a portal 57 to receive manually defined instructions and input for preprocessor 52 and server updater 55. The functionality of these elements is described in more detail herein below.

Robots 20 may each comprise a robot processor 30 which may communicate with server 50 during an initialization process, control and manage the runtime functionality of robot 20 and also provide and receive updates to and from server 50.

Figure 7A:
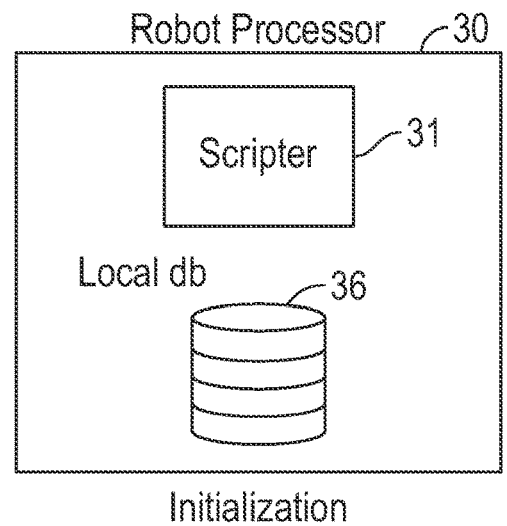
FIGS. 7A and 7B are schematic illustrations of the elements of robot processor of FIG. 6 at initialization and at runtime; constructed and operative in accordance with a preferred embodiment of the present invention.

Reference is now made to FIG. 7A which shows the elements of robot processor 30 before robot 20 is initialized. The robot processor may be manufactured with a scripter 31, a local database 36 and an assigned robot ID only. Scripter 31 may be responsible for managing the downloading and execution of the virtual containers that comprise the robot's features and functionality as described in more detail herein below. It will be appreciated that until the robot is initialized, local database 36 may be empty.

Figure 7B:
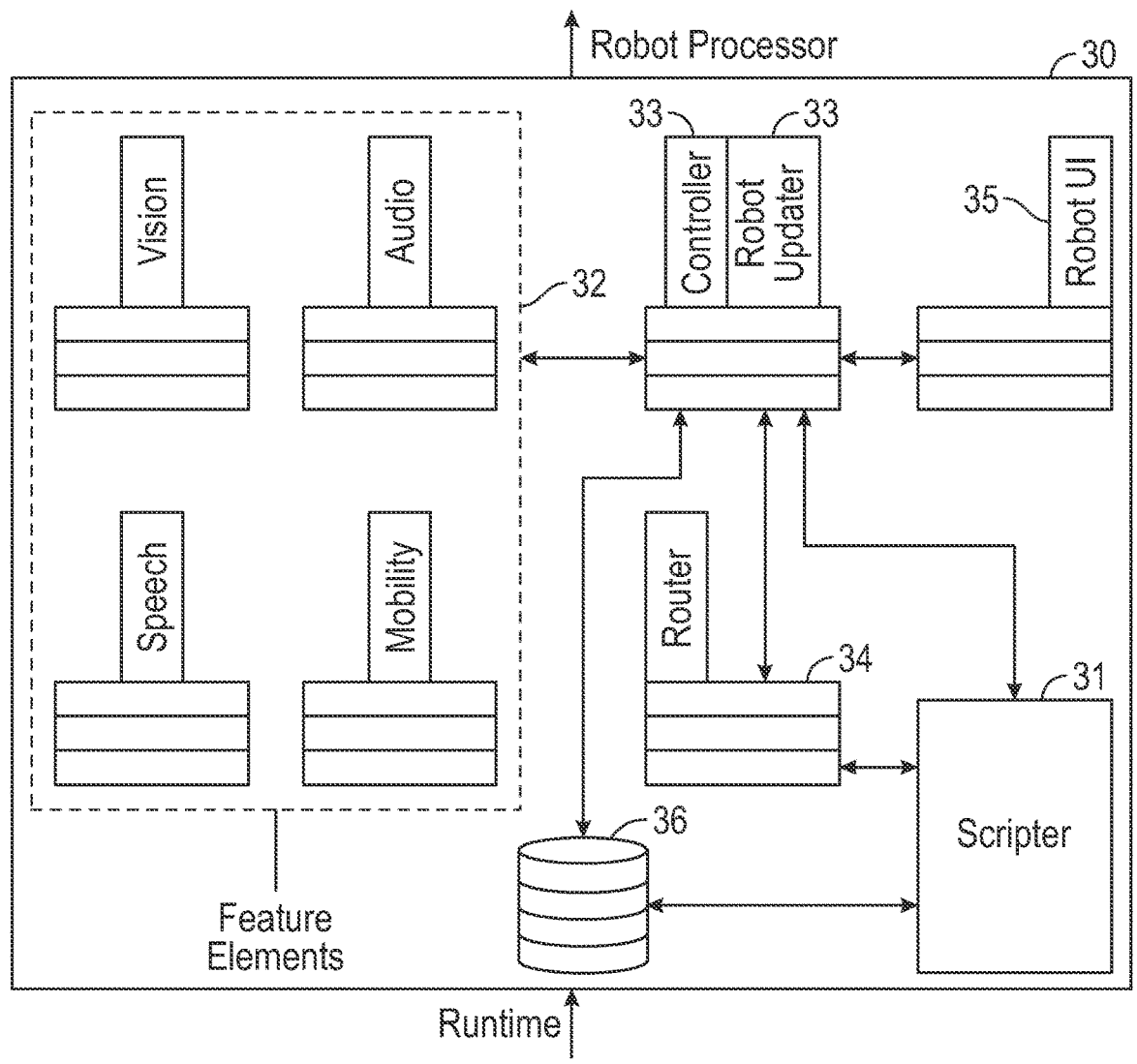

FIG. 7B shows the elements of robot processor 30 at runtime once robot 20 has been initialized. At runtime, robot processor 30 may comprise scripter 31 and local database 36 together with multiple feature element virtual containers 32, a controller 33 and a router 34. Controller 33 may comprise a robot updater 331. The functionality of these elements is discussed in more detail herein below.

Server 50 and robots 20 may communication via a MQTT (Message Queuing Telemetry Transport) broker from which may be self-hosted or managed. MQTT is a lightweight messaging protocol for use in cases where clients need a small code footprint and are connected to unreliable networks or networks with limited bandwidth resources. The back end may be considered server 50, which contains the data and software packages for all robots according to robot ID. Both server 50 and router 34 may be connected to the MQTT broker which allows for fast communication of small messages. They may differ from the data or software updates which are done by API calls and involve larger downloads. Robot 20 may also use MQTT broker locally to manage communication between all of its elements (i.e., scripter 31, local database 36, controller 33, router 34 and multiple feature element virtual containers 32). This is especially important for controller 33 which makes decisions for robot 20. For example, if we robot 20 is required to change to a specific screen once it has arrived at a specific destination, communication is required between the navigation virtual container, controller 33, and the robot UI virtual container. The navigation virtual container may send a message via MQTT to controller 33 to tell it that robot 22 has arrived at its destination. Controller 33, after determining what to do based on its internal logic, then sends a MQTT message to robot UI virtual container telling it which screen to now display. robot UI virtual container may receive this message and then perform whatever operations it needs to do to change to the requested screen.

Figure 8:
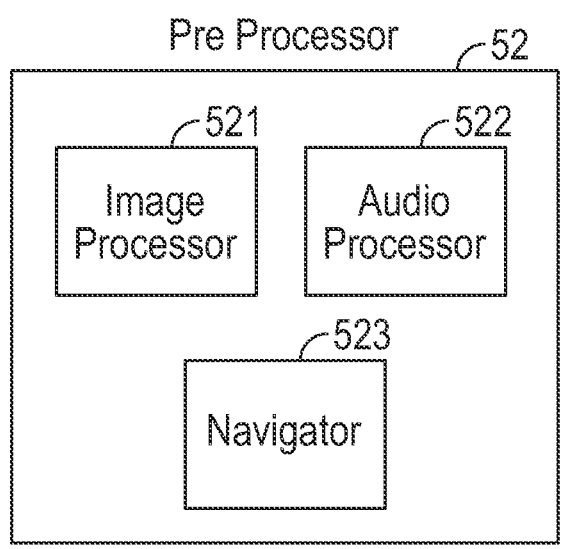
FIG. 8 is a schematic illustration of the elements of the preprocessor of FIG. 6, constructed and operative in accordance with a preferred embodiment of the present invention.

The elements of preprocessor 52 are shown in FIG. 8. The "heavy processing" requiring large processors may be performed on server 50 and output stored in server database 51. Server 50 and preprocessor 52 may provide high resource processing in order to provide support for intelligent operation of robot 20. Once robot 20 has been initialized it may only require low resource processing tasks in order to provide internal intelligence for robot 20.

Preprocessor 52 may comprise, but not be limited to, an image processor 521, an audio processor 522 and a navigator 523. The elements of preprocessor 52 may provide the operational data required to run scripts and activate robots 20. All the sub elements of preprocessor 52 may employ standard algorithms known in the art.

Image processor 521 may provide object recognition, facial recognition, OCR (optical character recognition) etc. Image processor may use haar classifiers for face recognition.

Audio processor 522 may be responsible for audio recognition, voice matching, NLP (natural language processing), speech to text, text to speech etc.

Navigator 523 may process continually updated maps for the local premises using a ROS navigation stack. Initially for navigation, it may operate partially from information received by robots 20 as described in more detail herein below. A single robot 20 may be used to draw an initial map which may be then used by other robots as a baseline for their own navigation. During their own navigation, other robots 20 may update the map using input that they receive from their sensors while they are active. Thus, maps may be continually updated.

Server database 51 may store the output of the elements of preprocessor 52 and may store, but not be limited to, faces, people, authority status, objects, maps, location names, recognized words and phrases, customer data, or any other robot operation data required or helpful to have robot 20 function correctly according to its assigned task. It may also store the robot management table listing per robot tasks and associated scripts, each robot having a task to perform and scripts and data to receive. Robot management table listing may also assign a task to a robot according to its ID number and/or customer number.

Initializer 54 may be responsible for coordinating with scripter 31 to retrieve the script for functionality and the required virtual containers from server database 51 for downloading to robot 20 according to the robot 20 ID.

Server updater 55 may coordinate server and data updates to both server 50 and robot processor 30 as described in more detail herein below.

Ping recognizer 56 may register when robot 20 happens to be online in order to provide updates as discussed in more detail herein below.

Portal 57 may be a suitable UI element and may be used (for example) by facility administrators to manage their data. For example, a clinic administrator may add users, user information, and status, doctors and nurses, through portal 57. A doctor can then be assigned to an examination room as their shift comes up etc.

Pre initialization, robot 20 may comprise scripter 31, local database 36 and have an ID number.

Scripter 31 may manage the downloading and execution via initializer 54 of the robot's script and virtual containers including controller 33 and router 34 and any virtual containers that represent the feature elements 32 required for the robot's functionality according to the robot 20 ID number and management table listing from server database 51. Each virtual container may be considered a packet of code that operates independently in its own virtual environment. Scripter 31 (using virtual container commands) may also, for example, shut down or power up a virtual container as needed or check to see if the current version of a virtual container is the most up-to-date and perform an update if needed as discussed herein below. Once launched by scripter 36, each virtual container may function independently.

Router 34 may handle the downloading data required for robot 20 features like maps, location names, face recognition data, etc. for the feature element virtual containers 32. Once it receives the data, it may send it to controller 33. Router 34 may manage traffic between server 50 and robot 20 by forwarding data packets to their intended IP addresses and allowing multiple devices to use the same Internet connection. Router 34 may also be responsible for sending the I Am Alive ping signal as discussed in more detail herein below.

Controller 33 may manage the intelligence and functioning of robot 20 using feature element virtual containers 32. Robot 20 may comprise senses and abilities. These may be, but are not limited to, speech recognition, natural language processing, vision, the ability to move, the ability to talk and the ability to communicate with a patient via a user interface (such as a robot screen/face). As an example, in a clinic assistant robot, the role of the robot is to register patients, take vitals, escort the patient to an examination, and then assist the doctor during the examination. Controller 33 may manage all the components that the robot can fulfill this functional specification. Controller 33 may create a closed and defined world in which the robot 20 exists.

Each robot 20 may have a unique ID to make it differentiable from other robots. Each set of data entered by an administrator (via portal 57) as part of the setup process may also have a unique customer number. The data downloaded to robot 20 during initialization may not be unique. An administrator with two robots 20 with two different IDs may have similar or identical data since they may both be operating within the same environment. Each robot ID may point to a set of features. As shown in FIG. 6, each robot 20 may comprise a different, similar, or identical set of features. Each feature may have a set of feature requirements need to function. For example, navigation may rely on image processing for obstacle avoidance. This allows scripter 31 (according to the associated script) to know exactly what features go where and what data to download during the initialization process. It also allows the proper allocation of virtual environment containers to its robot 20 depending on the robot's intended function.

Once robot 20 has been initialized with its virtual environment containers and associated data, it may be booted up for operation.

Feature element virtual containers 32 may provide functionality and intelligence for features as described herein above. FIG. 7B shows virtual containers 32 a-d representing features such as speech, vision, mobility and audio. It will be appreciated that other features not shown may also be used.

Robot UI 35 may be used to communicate and receive input from the patient or customers. As discussed herein above, robot 20 may comprise accessories such as microphones, speakers, cameras, and sensors to enable communication to happen and to be able to take readings (such as patient vitals) and appendages to perform certain tasks, like a robot arm.

Local database 36 may store the subsets of data downloaded from server database 51 during the initialization process, required by feature element virtual containers 32 to operate, such as maps, location names, recognized people etc. Any data received from server 50 may contain a timestamp of when it was uploaded. Local database 36 may be a memory module, a hard disk drive (HDD) or a solid-state drive (SSD).

There may be ongoing updates between server 50 and robot 20. Server 50 may have software and data updates for robot 20 and robot 20 may provide data requests to server 50. System data may also be continually updated. For example, if the updated data is customer data, the update process first requires the administrator to add or subtract any data in system 100 via portal 57. A further example is the addition of a new staff member requiring face recognition photos or when a patient leaves and his face recognition photos can be deleted. Other examples are changes to maps and location names etc.

When there is a server side update, server updater 55 may ping router 34 that an update is required for all robots whose robot IDs fall under the purview of the information update, in whole and/or in part. Router 34 may check to see if the update is new according to the data timestamp in local database 36 and then send a message to scripter 31 with the names of virtual containers to be updated. Any virtual container may be updated including element feature virtual containers 32, router 34 and controller 33.

Controller 33 may determine that robot 20 may require or be aided by a script or part of script/set of code that is not currently installed. Controller 33 may determine that a robot's performance is below a threshold at any time or a set number of times in whole or on average. It also may determine if the performance of a task is suboptimal or incomplete or failed. Controller 33 may also determine if there is an additional script or virtual environment container, or general information required by robot 20 that may be missing and require downloading from server 50.

This controller 33 may further comprise a robot updater 331. Robot updater 331 may determine that a certain amount of time has passed since a previous update. An example is robot 20 encountering an obstacle during navigation that prevents it from reaching its desired destination or repeatedly failing in speech or voice recognition.

Robot updater 331 may also determine if there is an additional script or virtual container, or general information required by robot 20 that may be available on server 50. Controller 33 may initiate a request to initializer 54 when connected to the internet or next connection to the internet to receive an update. Scripter 31 may download additional scripts or virtual containers.

Server database 51 may store all available software for robot 20. If initializer 54 cannot identify any appropriate new software for robot 20 in server database 51, then the update is canceled. The conditions for the search for an update may be determined either by the robot's request or by a server-side analysis of the result of any performance analysis performed by controller 33.

Ping recognizer 56 may know which robots 20 are currently connected to server 50 and which of those have robot IDs associated with the data update, in whole or in part. Server updater 55 may then send out an update message to all robots 20 that are currently connected to server 50 and which of those have robot IDs associated with the data update (and eventually reaches all robots that are not yet connected to the server when they eventually connect to the server). The server 50 administrator can decide when the update will occur or router 34 may download the update at a point when robot 20 is connected to server 50 and has downtime between tasks, or some combination of both. The update may have the server data from server database 51 sent via router 34 and stored locally on local database 36. Router 34 may store this information on local database 36 for future reference during updates.

When an update is available from server 50, server updater 55 may ping router 34 which then sends a message to scripter 31 with the names of virtual containers to be updated. Scripter 31 may use API calls to download the updated virtual containers from server 50. Once the updated virtual containers are downloaded, scripter 31 may communicate with controller 33 to determine the best time to restart the robot so as not to interrupt robot 20 if it's in the middle of an important task.

Robot 20 requires a network connection 5 with server 50 in order to initialize robot 20 for the task in hand. A network connection is also required for robot 20 to receive any updates from sever 50 such as (for example updated navigation maps) and vice versa.

Router 34 may send an "I Am Alive" ping signal. The ping signal may be received by ping recognizer 56 if and when the robot is online with server 50. Router 34 may comprise an internal clock set to ping server 50. The ping signal may be sent at a predefined time interval such as every 5 minutes, every hour, every 10 minutes, 1, minute, 1 millisecond etc. At each interval, router 34 may use the robot's ID as well as the provided URL to perform an API call to ping recognizer 56, letting server 50 know that robot 20 is online.

Thus robots 20 may offload much of the strenuous processing that would normally fall on their processors, allowing for the installation of smaller and cheaper processors instead. This may have applications for improving performance and cost. For example, downloading and operating all virtual containers on every robot may overload and even fry the server central processing unit (CPU) or require a much larger and more expensive server CPU to function. It is much more efficient and cost-effective to have each robot only running the virtual containers it needs for its specific function. Furthermore, having a central server, serving multiple robots performing same/different tasks can also be advantageous since updates from one robot can benefit another.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A server for initializing a plurality of robots, each robot of the plurality of robots having a unique robot ID stored on the server and programmed to be initialized to have a specified set of features for performing a set of tasks, the server comprising:

a robot management table listing for each robot, at least one feature of the specified set of features and at least one script according to the unique robot ID;

an operational database storing operational data required for running the at least one script;

a preprocessor to run at least one algorithm to obtain and update the operational data; and an initializer to initialize a particular robot of the plurality of robots according to the unique robot ID and associated scripts when the particular robot is within a distance enabling network communication with the particular robot, wherein the initialization of the particular robot comprises downloading to the particular robot from the robot management table the at least one feature of the specified set of features listed for the particular robot, wherein pursuant to initialization of the particular robot, the particular robot is enabled to operate the at least one feature independent of network communication with the server.

2. The server according to claim 1 further comprising:

a server updater to coordinate updates of the set of features and the operational data for the plurality of robots;

a ping recognizer to identify a ping signal sent from the particular robot when the particular robot is within the distance enabling network communication with the particular robot; and a portal to receive instructions and input for the preprocessor.

3. The server according to claim 1, wherein the set of features comprises:

an image processor to provide at least one of: object recognition, facial recognition and OCR (optical character recognition) capabilities to the plurality of robots;

an audio processor to provide at least one of: audio recognition, voice matching, NLP (natural language processing), speech to text and text to speech capabilities to the plurality of robots; and a navigator to process maps of local premises to the plurality of robots.

4. A system comprising:

a plurality of robots, wherein each robot of the plurality of robots having a unique robot ID and programmable to have a specified set of features for performing a set of tasks;

a plurality of servers for initializing the plurality of robots, wherein at least one server of the plurality of servers comprises:

a robot management table listing for each robot, at least one feature and at least one script according to the unique robot ID;

a server database to store organized collections of electronic data, wherein one of the organized collections of electronic data comprises an operational database storing operational data required for running the at least one script;

a preprocessor to run at least one algorithm to obtain and update the operational data; and an initializer to initialize a particular robot of the plurality of robots according to the unique robot ID and associated scripts when the particular robot is within a distance enabling network communication with the particular robot, wherein the initialization of the particular robot comprises downloading to the particular robot from the robot management table the at least one feature of the specified set of features listed for the particular robot, wherein pursuant to initialization of the particular robot, the particular robot is enabled to operate the at least one feature independent of network communication with the plurality of servers.

5. The system according to claim 4, wherein the at least one server of the plurality of servers comprises an organized collection of data comprising a specified set of features and at least another one server of the plurality of servers comprises an organized collection of data comprising a specified set of roles.

6. The system according to claim 5 wherein the at least one server further comprises:
 a server updater to coordinate updates of the set of features and the operational data for the plurality of robots;
 a ping recognizer to identify a ping signal sent from the particular robot when the particular robot is within the distance enabling network communication with the particular robot; and
 a portal to receive instructions and input for the preprocessor.

7. The system according to claim 5, wherein the set of features comprises:
 an image processor to provide at least one of: object recognition, facial recognition and OCR (optical character recognition) capabilities to the plurality of robots;
 an audio processor to provide at least one of: audio recognition, voice matching, NLP (natural language processing), speech to text and text to speech capabilities to the plurality of robots; and
 a navigator to process maps of local premises to the plurality of robots.

* * * * *